(12) United States Patent
Zhao et al.

(10) Patent No.: US 10,844,531 B2
(45) Date of Patent: Nov. 24, 2020

(54) HOUSEHOLD APPLIANCE SUPPORT AND HOUSEHOLD APPLIANCE

(71) Applicants: QINGDAO HAIER WASHING MACHINE CO., LTD., Shandong (CN); QINGDAO HAIER SMART TECHNOLOGY R&D CO., LTD., Shandong (CN)

(72) Inventors: Zhiqiang Zhao, Shandong (CN); Sheng Xu, Shandong (CN); Yang Li, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN)

( * ) Notice: Subject to any disclaimer, the term of this patent is extended or adjusted under 35 U.S.C. 154(b) by 0 days.

(21) Appl. No.: 16/632,024

(22) PCT Filed: Jul. 13, 2018

(86) PCT No.: PCT/CN2018/095560
§ 371 (c)(1),
(2) Date: Jan. 17, 2020

(87) PCT Pub. No.: WO2019/015530
PCT Pub. Date: Jan. 24, 2019

(65) Prior Publication Data
US 2020/0149206 A1 May 14, 2020

(30) Foreign Application Priority Data
Jul. 21, 2017 (CN) .......................... 2017 1 0601953

(51) Int. Cl.
*A47B 91/00* (2006.01)
*D06F 37/20* (2006.01)
*F16F 15/023* (2006.01)

(52) U.S. Cl.
CPC ............ *D06F 37/20* (2013.01); *F16F 15/023* (2013.01)

(58) Field of Classification Search
CPC ....... A47B 91/16; D06F 39/12; D06F 39/125; F16F 15/023; Y10T 29/49918
See application file for complete search history.

(56) References Cited

U.S. PATENT DOCUMENTS 3,970,273 A * 7/1976 Tanner ...................... F16F 1/44
248/615
4,979,786 A * 12/1990 Kuraseko ................ F16F 1/377
312/351.3
(Continued)

FOREIGN PATENT DOCUMENTS

CN 2437946 Y 7/2001
CN 1576679 A 2/2005
(Continued)

OTHER PUBLICATIONS

English Translation of Xu (CN105755757) (Year: 2020).*
(Continued)

*Primary Examiner* — Matthew W Ing
(74) *Attorney, Agent, or Firm* — Buchanan Ingersoll & Rooney PC

(57) ABSTRACT

A household appliance support and a household appliance are disclosed. The household appliance support comprises: a hydraulic plate; a sheath, being fixedly connected with the hydraulic plate; a regulating foot, being arranged in the sheath and axially movable relative to the sheath and provided with a supporting end part in supportable contact with a supporting surface; an accommodation chamber, being (Continued)

formed by the hydraulic plate, the sheath and the regulating foot; a hydraulic medium, being accommodated in the accommodation chamber in a sealed manner, wherein under the effect of a pressure, the hydraulic medium is compressed or expanded to drive the regulating foot to move axially in the sheath for leveling; and a damping element, being embedded and mounted on the supporting end part of the regulating foot, to increase the supporting damping force between the regulating foot and the supporting surface.

10 Claims, 3 Drawing Sheets

(56) References Cited

U.S. PATENT DOCUMENTS

| | | | |
|---|---|---|---|
| 10,626,541 B2* | 4/2020 | Zhao | ............... F16M 7/00 |
| 2004/0263032 A1 | 12/2004 | Cho | |
| 2006/0180720 A1 | 8/2006 | Cournoyer et al. | |
| 2007/0262213 A1 | 11/2007 | De Toledo et al. | |
| 2018/0202095 A1 | 7/2018 | Zhao et al. | |
| 2019/0330789 A1* | 10/2019 | Zhao | ............... D06F 39/125 |
| 2019/0390388 A1* | 12/2019 | Zhao | ............... D06F 37/20 |
| 2020/0032948 A1* | 1/2020 | Zhao | ............... D06F 39/125 |
| 2020/0141041 A1* | 5/2020 | Zhao | ............... F16M 7/00 |
| 2020/0141046 A1* | 5/2020 | Zhao | ............... D06F 39/12 |
| 2020/0173095 A1* | 6/2020 | Zhao | ............... D06F 39/125 |

FOREIGN PATENT DOCUMENTS

| | | |
|---|---|---|
| CN | 2913729 Y | 6/2007 |
| CN | 101070941 A | 11/2007 |
| CN | 104421368 A | 3/2015 |
| CN | 105755757 A | 7/2016 |
| CN | 205636216 U | 10/2016 |
| CN | 205745931 U | 11/2016 |
| CN | 106868789 A | 6/2017 |
| CN | 107761312 A | 3/2018 |
| CN | 107761321 A | 3/2018 |
| DE | 20118743 U1 | 4/2003 |
| KR | 20030080906 A | 10/2003 |

OTHER PUBLICATIONS

International Search Report (PCT/ISA/210) dated Sep. 30, 2018, by the Chinese Patent Office as the International Searching Authority for International Application No. PCT/CN2018/095560.

Search Report issued by The State Intellectual Property Office of People's Republic of China in corresponding Chinese Patent Application No. 201710601953.7 dated Jun. 23, 2020 (3 pages).

* cited by examiner

HOUSEHOLD APPLIANCE SUPPORT AND HOUSEHOLD APPLIANCE

TECHNICAL FIELD

The present disclosure relates to the technical field of support leveling of a household appliance, in particular to a household appliance support and a household appliance.

BACKGROUND

A household appliance is generally provided with a leveling device at the bottom of its casing. During placement of the household appliance, the leveling device is adjusted to make the household appliance stably placed. After the household appliance is leveled, the leveling device can support the household appliance to keep the household appliance stable.

Taking a washing machine for example, the existing washing machine is usually provided with bolt feet mounted at the bottom of its casing or the whole machine. Each bolt foot comprises a screw rod, a nut washer and a rubber pad, the nut washer can be screwed up and down around the screw rod, and the screw rod can also be screwed up and down in a screw hole in a base plate of the casing. Therefore, the height of the washing machine can be adjusted by screwing the screw rods of the bolt feet into different lengths of the screw holes of the base plate. Mostly, the height of tire washing machine is increased if the feet of the washing machine rotate counterclockwise, and the height of the washing machine is reduced if the feet of the washing machine rotate clockwise. After the height adjustment of the bolt feet is completed, the nut washers for preventing loosening are tightened to keep the washing machine stable.

Although said bolt feet of the washing machine implement the leveling of the washing machine, a user still needs to carry out manual adjustment. If the washing machine has a relatively large self-weight or a placement space for the washing machine is narrow, it is very inconvenient to operate for user. Additionally, vibration of the washing machine in a long-term working process also act on the leveling feet and causes support failure of the feet, resulting in unlevel placement of the washing machine.

For example, an existing 80 KG drum washing machine generally has a weight of about 80 KG, which is relatively heavy, so its height adjustment is very inconvenient for users. Even though the height adjustment is completed, it cannot be ensured that the washing machine is adjusted to an optimal state. When the washing machine works, especially accelerates from 0 r/min to about 1400 r/min for drying, large vibration will occur if the washing machine is placed unlevel or has a failure of support problem, which greatly influences use comfortableness of the user.

In addition, the vibration of the unlevel washing machine may cause loosening of foot screws, which result in vertical movement of a foot bracket, and such unstability may change the leveling state of the washing machine and cause stronger vibration. Due to such vicious circle, after the washing machine is used for a long term, the noise is larger and larger, the washing machine per se is also damaged to a certain extent, and the service life of the washing machine is shortened.

Therefore, the leveling of the existing washing machine has problems that manual adjustment is needed, time and labor are wasted, and precision is relatively low.

In view of the foregoing, the present disclosure is proposed.

SUMMARY

To solve the above problem, a first disclosure purpose of the present disclosure is to provide a household appliance support, specifically; the following technical solutions are adopted:

A household appliance support, comprising:
a hydraulic plate;
a sheath, being fixedly connected with the hydraulic plate;
a regulating foot, being arranged in the sheath and being axially movable relative to the sheath, and provided with a supporting end part in supportable contact with a supporting surface;
an accommodation chamber, being formed by the hydraulic plate, the sheath and the regulating foot;
a hydraulic medium, being accommodated in the accommodation chamber in a sealed manner, where under the effect of pressure, the hydraulic medium is compressed or expanded to drive the regulating foot to move axially in the sheath for leveling; and
a damping element, being embedded and mounted on the supporting end part of the regulating foot to increase a supporting damping force between the regulating foot and the supporting surface.

Further, one end of the regulating foot is arranged in the sheath and axially movable relative to the sheath, the another end of the regulating foot is the supporting end part;
a mounting groove is arranged on the supporting end part, and the damping element is embedded and mounted in the mounting groove.

Further, the mounting groove comprises a first mounting groove concaved from the supporting end part,
the damping element is provided with a first convex part protruded out of a upper surface of the damping element, and
the first convex part is embedded into the first mounting groove.

Further, the mounting groove further comprises a second mounting groove concaved from the supporting end part, and
a depth of the second mounting groove is greater than a depth of the first mounting groove;
the damping element is provided with a second convex part protruded out of the upper surface, and
a height of the second convex part is greater than a height of the first convex part; and
the first convex part is correspondingly embedded into the first mounting groove, and the second convex part is correspondingly embedded into the second mounting groove.

Further, the first mounting groove is an annular groove which takes a center of the supporting end part as a center,
the first convex part is an annular convex step which protrudes out of the upper surface of the damping element and takes a center of the damping element as a center, and
the annular convex step is matched with the annular groove; and
the second mounting groove is a circular groove which is arranged in a center area of the supporting end part,
the second convex part is a convex column structure which protrudes out of the upper surface of the damping element and is arranged in a center area of the damping element, and
the convex column structure is embedded into the circular groove.

Further, the first mounting groove is formed by setting a middle part of a bottom wall of the supporting end part to be lower than an edge of the bottom wall, and the second mounting groove is formed by enabling a central position of the bottom wall of the supporting end part to be concave towards an inside of the regulating foot.

Further, the household appliance support comprising a flexible accommodation body with a chamber therein, wherein the hydraulic medium is accommodated in the chamber of the flexible accommodation body, the flexible accommodation body is provided with an opening part, and is mounted on the hydraulic plate in a sealed manner, and a liquid flow passage is formed inside the hydraulic plate and communicated with the chamber of the flexible accommodation body;

the hydraulic medium in the flexible accommodation body is compressed or expanded with pressure changes, so the hydraulic medium flows between the flexible accommodation body and the liquid flow channel, to drive the regulating foot to move axially in the sheath for leveling; and an evading part is arranged, corresponding to the second mounting groove of the regulating foot, on the flexible accommodation body.

Further, the flexible accommodation body comprises a accommodating body which is stretchable, the opening part is a thin-diameter structure which is communicated with the accommodation body, the accommodation body is arranged inside the regulating foot, and one end, in contact with an inner wall of the supporting end part, of the accommodation body is partially concave corresponding to the second mounting groove to form the evading part.

Further, a surface of one end of the hydraulic plate is provided with a mounting convex column, the opening part of the flexible accommodation body covers the mounting convex column and is mounted on the hydraulic plate in a sealed manner, and an end part of the mounting convex column is provided with a groove.

A second disclosure object of the present disclosure is to provide a household appliance which is provided with a household appliance support mentioned in any of the above items.

As to the household appliance support provided in the present disclosure, based on the hydraulic principle, due to different pressures resulting from unflatness, the household appliance support can perform adaptive regulation automatically because of the fluidity of the hydraulic medium, until the household appliance support achieves balance, and thus, the hydraulic medium stops circulating and automatic leveling is achieved.

As to the household appliance support in the present disclosure, the damping element and the regulating foot are mounted in an embedded manner. The embedded mounting structure is reasonable in setting, does not influence the height of the regulating fool of the household appliance support, reasonably utilizes internal space, realizes great improvement in connection strength between the damping element and the regulating foot, and avoids the possibility of falling off of the damping element.

DETAILED DESCRIPTION

The household appliance support and the household appliance will be described in detail below in combination with accompanying drawings:

Embodiment 1

Figure 1:
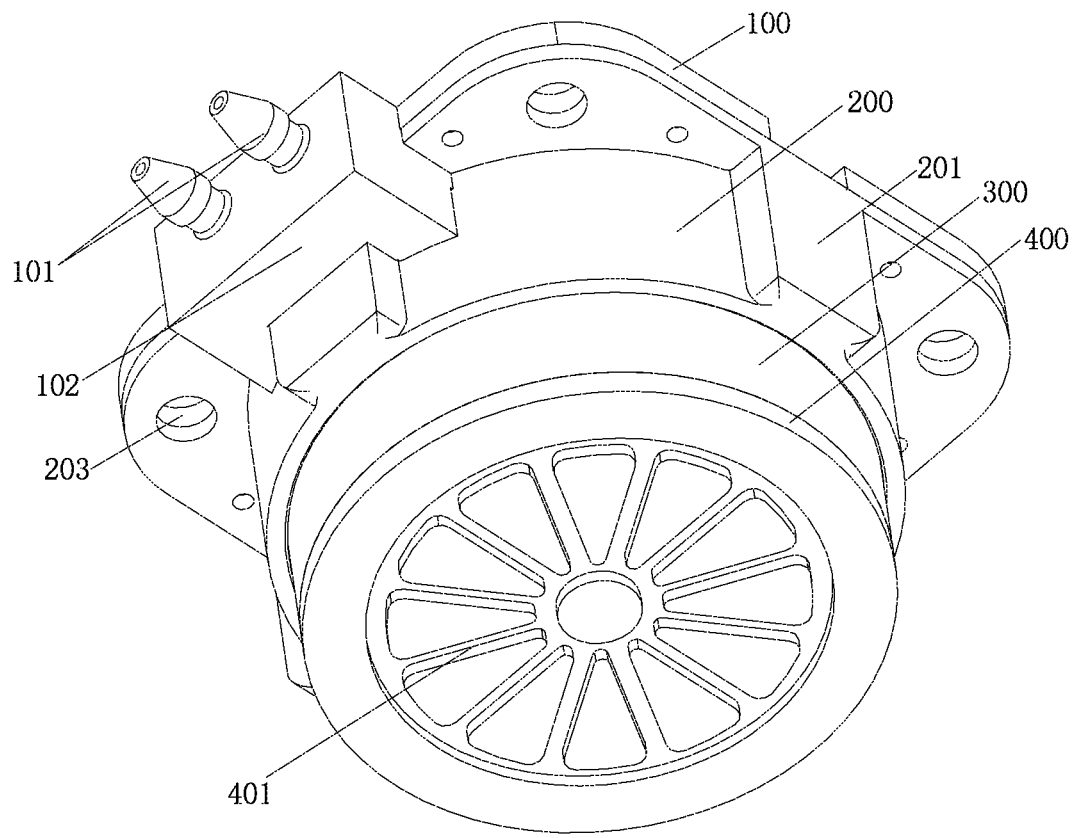
FIG. 1 is a first three-dimensional structural schematic diagram of the household appliance support in an embodiment of the present disclosure.
Figure 2:
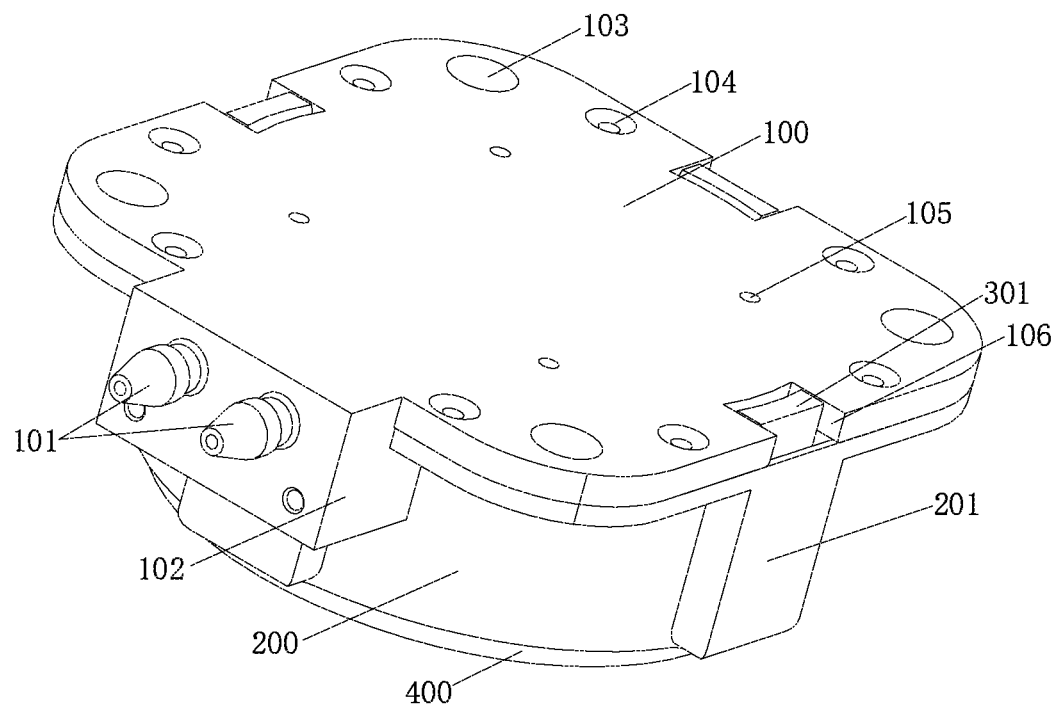
FIG. 2 is a second three-dimensional structural schematic diagram of the household appliance support in an embodiment of the present disclosure.
Figure 3:
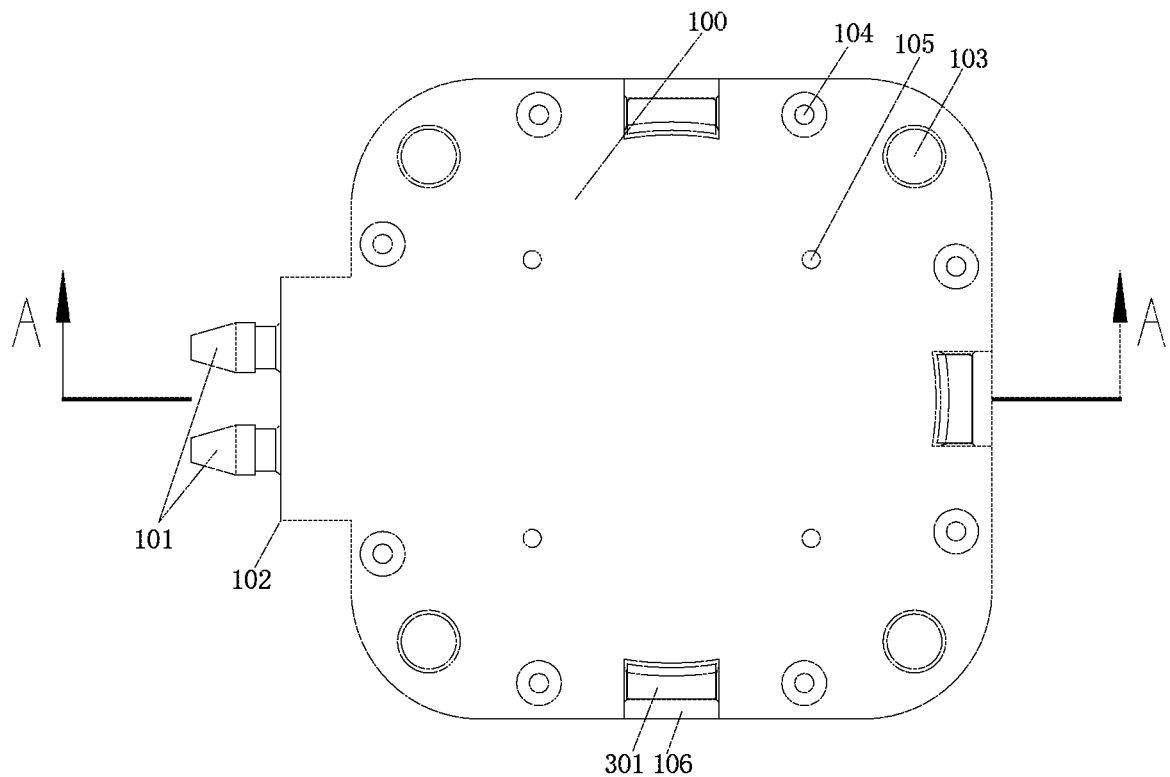
FIG. 3 is a top view of the household appliance support in an embodiment of the present disclosure.
Figure 4:
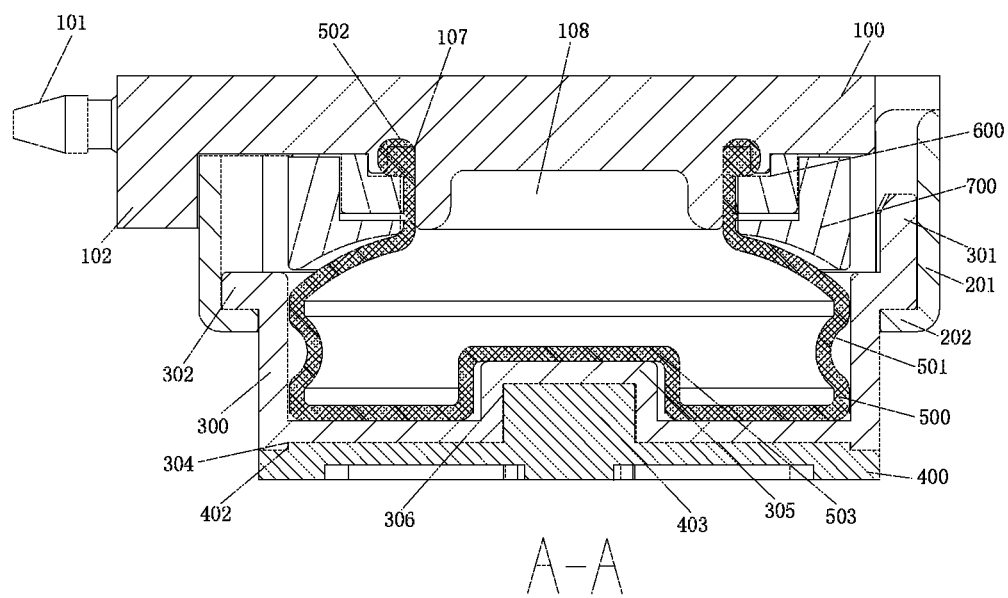
FIG. 4 is a section view (extended state) of the household appliance support in an embodiment of the present disclosure taken along a section A-A in FIG. 3.
Figure 5:
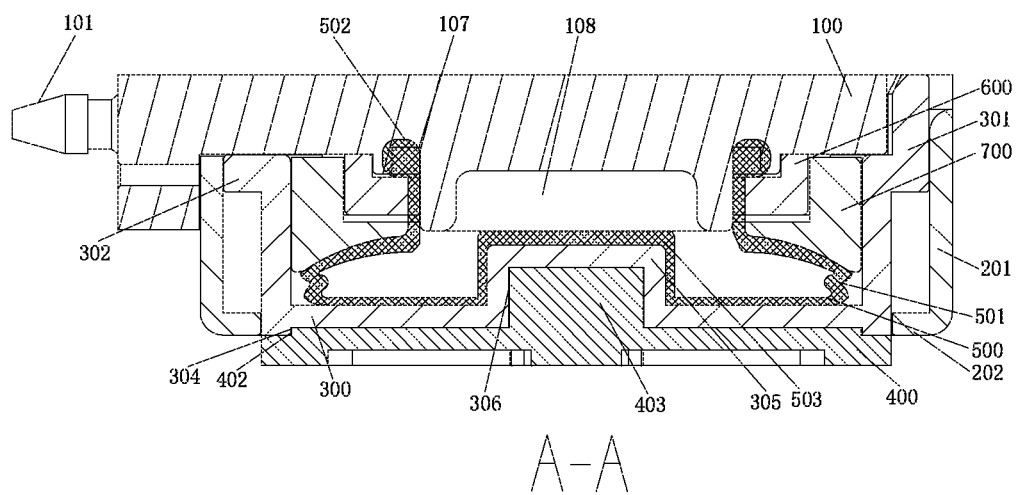
FIG. 5 is a section view (compressed state) of the household appliance support in an embodiment of the present disclosure taken along a section A-A in FIG. 3.

As shown in FIG. 1 to FIG. 5, a household appliance support in the present embodiment includes:

a hydraulic plate 100;

a sheath 200, being fixedly connected with the hydraulic plate 100;

a regulating foot 300, being arranged in the sheath 200 and being axially movable relative to the sheath 200, and being provided with a supporting end part in supportable contact with a supporting surface;

an accommodation chamber, being formed by the hydraulic plate 100, the sheath 200 and the regulating foot 300;

a hydraulic medium, being accommodated in the accommodation chamber in a sealed manner, wherein under the effect of pressure, the hydraulic medium is compressed or expanded to drive the regulating foot 300 to move axially in the sheath 200 for leveling; and a damping element 400, being embedded and mounted on the supporting end part of the regulating foot 300, to increase a supporting damping force between the regulating foot 300 and the supporting surface.

As to the household appliance support provided in the present embodiment, based on the hydraulic principle, due to different pressures resulting from unflatness, the regulating foot 300 can perform adaptive regulation automatically because of the fluidity of the hydraulic medium, until the household appliance support achieves balance, and thus, the hydraulic medium stops circulating and automatic leveling is achieved.

The damping element 400 of the present embodiment is mounted on the support end part of the regulating foot 300 in an embedded manner, thereby increasing the damping force between the household appliance support and the supporting surface, having a better slip resistance, and ensuring supporting stability.

In addition, since the damping element 400 is subjected to a transverse acting force, after a certain time, the damping element 400 easily falls off when the connection between the damping element 400 and the regulating foot 300 is not reliable, therefore, the embedded mounting manner of the damping element 400 in the present embodiment greatly increases the connecting compactness between the damping element and the regulating foot 300, and avoids the damping element from falling off.

Specifically, in the present embodiment, one end of the regulating foot 300 is arranged in the sheath 200 and axially movable relative to the sheath 200 and another end is the supporting end part. The supporting end part is provided with a mounting groove, and the damping element 400 is embedded and mounted in the mounting groove. In the present embodiment, the damping element 400 is mounted in the mounting groove of the regulating foot 300 in an embedded manner, in this way, when the damping element 400 is subjected to the transverse acting force, the damping element 400 is subjected to transverse limiting block of the mounting groove, thereby avoiding the damping element 400 from falling off under the transverse acting force due to a transverse displacement between the damping element 400 and the regulating foot 300.

As a mode of execution of the present embodiment, the mounting groove includes a first mounting groove 304 concaved from the supporting end part, the damping element 400 is provided with a first convex part 402 protruded out of an upper surface of the damping element 400, and the first convex part 402 is embedded into the first mounting groove 304.

Further, the mounting groove further comprises a second mounting groove 306 concaved from the supporting end part, and a depth of the second mounting groove 306 is greater than a depth of the first mounting groove 304; the damping element 400 is provided with a second convex part 403 protruded out of the upper surface, and a height of the second convex part 403 is greater than a height of the first convex part 402; and the first convex part 402 is correspondingly embedded into the first mounting groove 304, and the second convex part 403 is correspondingly embedded into the second mounting groove 306.

The mounting groove of the present embodiment includes the first mounting groove 304 and the second mounting groove 306 which have different depths, while the corresponding damping element 400 is provided with the first convex part 402 and the second convex part 403 which have different heights, in this way, the damping element 400 is correspondingly embedded into the mounting groove of the regulating foot 300 for positioning mounting, and the mounting grooves with different depths and the convex parts with different heights enable the embedded mounting of the damping element 400 to be more compact, and capable of resisting against the greater transverse acting force.

Specifically, in the present embodiment, the first mounting groove 304 is an annular groove which takes the center of the supporting end part as a center, the first convex part 402 is an annular convex step which protrudes out of the upper surface of the damping element 400 and which takes the center of the damping element 400 as a center, and the annular convex step is matched with the annular groove; and the second mounting groove 306 is a circular groove which is arranged in a center area of the supporting end part, the second convex part 403 is a convex column structure which protrudes out of the upper surface of the damping element 400 and which is arranged in a center area of the damping element 400, and the convex column structure is embedded into the circular groove.

The embedded mounting of the annular convex step and the annular groove in the present embodiment can resist against a general transverse acting force on the damping element, while the embedded mounting of the convex column structure and the circular groove can resist against a greater transverse impact force on the damping element. Therefore, the embedded mounting manner of the damping element 400 and the regulating foot 300 in the present embodiment can resist against a larger range of the transverse acting force, thereby avoiding falling off of the damping element 400 due to transverse movement of the damping element 400 under the transverse acting force.

Further, in the present embodiment, the first mounting groove 304 is formed by setting a middle part of a bottom wail of the supporting end part to be lower than an edge of the bottom wall, and the second mounting groove 306 is formed by enabling the central position of the bottom wall of the supporting end part to be concave towards the inside of the regulating foot.

The household appliance support in the present embodiment further comprising a flexible accommodation body 500 with a chamber therein, the hydraulic medium is accommodated inside the chamber of the flexible accommodation body 500, the flexible accommodation body 500 is provided with an opening part 502, and is mounted on the hydraulic plate 100 in a sealed manner, and a liquid flow passage is formed inside the hydraulic plate 100 and communicated with chambers inside the flexible accommodation body 500.

The hydraulic medium in the flexible accommodation body 500 is compressed or expanded with pressure changes, and the hydraulic medium flows between the flexible accommodation body 500 and the liquid flow channel, to drive the regulating foot 300 to move axially in the sheath 200 for leveling.

An evading part 503 is arranged, corresponding to the second mounting groove 306 of the regulating foot 300, on the flexible accommodation body 500.

Since the second mounting groove 306 is formed when the central position of the bottom wall of the supporting end part is concave towards the inside of the regulating foot, correspondingly, a column-shaped projection 305 is formed on an internal bottom wall of the regulating foot, and the evading part 503 is actually set corresponding to the column-shaped projection 305, and is set to evade from the column-shaped projection 305.

Further, the flexible accommodation body 500 comprises a accommodating body 501 which is stretchable, the opening part 502 is a thin-diameter structure which is communicated with the accommodating body 501, the accommodating body 501 is arranged inside the regulating foot 300, and one end, in contact with an inner wall of the supporting end part, of the accommodating body 501 is partially concave corresponding to the second mounting groove 306 to form the evading part 503.

A damping rib 401 is arranged on the surface, in contact with the supporting surface, of the damping element 400 of the present embodiment, to increase damping effect, improve friction force to the supporting surface, and enhance stability. The damping element 400 in the present embodiment can adopt rubber shim, etc.

In addition, in the present embodiment, a surface of one end of the hydraulic plate 100 is provided with a mounting convex column, the opening part 502 of the flexible accommodation body 500 covers the mounting convex column and is mounted on the hydraulic plate 100 in a sealed manner, and an end part of the mounting convex column is provided with a groove 108.

The connecting mode between the damping element 400 and the regulating foot in the present embodiment can be in-mold injection molding, bonding, etc. The connecting mode is simple, the connection stability is strong, and falling off of the damping element 400 is avoided.

In the present embodiment, the damping element 400 and the regulating foot 300 are mounted in an embedded manner. The embedded mounting structure is reasonable in setting, does not influence the height of the regulating foot 300 of the household appliance support, and reasonably utilizes internal space, thereby greatly increasing connection strength between the damping element 400 and the regulating foot 300, and avoiding the possibility of falling off of the damping element.

Embodiment 2

As shown in FIG. 1 to FIG. 5, a household appliance support comprises:

a hydraulic plate 100;

a sheath 200, which is fixedly connected with the hydraulic plate 100;

a regulating foot 300, which is arranged in the sheath 200 and is axially movable relative to the sheath 200;

an accommodation chamber, which is formed by the hydraulic plate 100, the sheath 200 and the regulating foot 300; and a hydraulic medium, which is arranged in the accommodation chamber and is compressed or expanded depending on pressure changes to drive the regulating foot 300 to axially move in the sheath 200 for leveling.

According to the household appliance support provided by the embodiment, based on the hydraulic principle, the regulating foot can perform adaptive regulation automatically because of the fluidity of the hydraulic medium due to different pressures resulting from unflatness, the hydraulic medium stops circulating until the household appliance support achieves balance, and thus, automatic leveling is achieved.

According to the household appliance support provided by the embodiment, a first mounting structure 103 which is used for being fixedly connected with a bottom plate of a household appliance is arranged on the hydraulic plate 100; and a second mounting structure 104 which is used for being fixedly connected with the sheath 200 is arranged on the hydraulic plate 100.

According to the embodiment, the regulating foot 300 is axially movably sleeved in the sheath 200, and then the hydraulic plate 100 is fixedly connected with the sheath 200 through the second mounting structure 104, so that the independent assembly of the household appliance support is achieved. The assembled household appliance support is then integrally mounted on the bottom plate of the household appliance through the first mounting structure 103, and thus, the household appliance support is mounted on the household appliance.

According to the embodiment, the assembling of the household appliance support is achieved through the second mounting structures 104; the household appliance support is mounted on the household appliance through the first mounting structures 103. And corresponding mounting is achieved through different mounting structures, so that the global stability of the household appliance support is ensured, and the stability of mounting of the household appliance support on the household appliance is also ensured.

In this embodiment, the hydraulic plate 100 of the household appliance support is directly fixed to the bottom of the household appliance; the sheath 200 and the hydraulic plate 100 are fixedly connected. Thus, the hydraulic plate 100 is clamped by the bottom of the household appliance and the sheath 200. So that the strength of fixed connection between the hydraulic plate 100 and the sheath 200 is not necessary, a main purpose of connection between the hydraulic plate 100 and the sheath 200 is to form an integrated foot. And the strength of the connection is irrelevant to the size of gravity of the household appliance and the size of a supporting force of the regulating foot 300. Therefore, for the household appliance support provided by the present disclosure, the hydraulic plate 100 and the sheath 200 can be rapidly, reliably and fixedly connected, the requirements on the strength of connection between the hydraulic plate 100 and the sheath 200 are lowered, and the essential space and height required by the connection are further lowered.

In summary, the household appliance support provided by the embodiment is simpler in structure, simpler and more convenient in mounting, and has better stability.

In addition, with a structural design of the household appliance support provided by the embodiment, the overall height of the household appliance support can be further lowered, and thus, the household appliance support has a better shock absorption effect on the household appliance. Taking a washing machine as an example, the household appliance support, provided by the present disclosure has a better shock absorption effect on dewatering vibration of the washing machine.

As a preferred implementation mode of the embodiment, the first mounting structures 103 are first mounting holes formed in the hydraulic plate. And the hydraulic plate 100 is fixedly connected to the bottom plate of the household appliance in a manner that first connecting members pass through the first mounting holes.

Concretely, in the embodiment, the first mounting holes are screw holes, the first connecting members are screws. The mounting holes for the screws to pass through are formed in the bottom plate of the household appliance, and the screws pass through the mounting holes in the bottom plate and are mounted to the screw holes in the hydraulic plate 100 to achieve fixed mounting.

Concretely, in the embodiment, the second mounting structures 104 are second mounting holes, and the hydraulic plate is fixedly connected with the sheath in a manner that second connecting members pass through the second mounting holes.

Further, in the embodiment, the upper end of the sheath 200 is flanged to form a mounting plane, and the mounting plane is fit with the bottom surface of the hydraulic plate 100 and is fixedly connected with the bottom surface of the hydraulic plate 100. And fourth mounting holes corresponding to the second mounting holes are formed in the mounting plane.

According to the embodiment, the mounting plane of the sheath 200 is fit with the hydraulic plate 100, thus, more pressure can be transferred to the mounting plane and is dispersed to prevent, the hydraulic plate 100 from bearing too high pressure. Because liquid flow passages for circulation of the hydraulic medium are formed inside the hydraulic plate 100, the stability of the hydraulic plate 100 is a key to the stabilizing and leveling of the entire household appliance support. According to the embodiment, the mounting plane is formed by the outward flanging of the upper end of the sheath 200, thus, the mounting contact area of the sheath 200 and the hydraulic plate 100 is increased, which facilitates the stability and dispersion of the hydraulic plate 100 transmitting force to the mounting plane of the sheath 200.

In addition, the mounting plane of the sheath 200 is fit with the hydraulic plate 100 and is fixedly connected with the hydraulic plate 100, avoiding mounting structures on the sheath 200 or hydraulic plate 100 and lowering the overall structure of the household appliance support.

Further, in the embodiment, an outline of the mounting plane is matched with an outline of the hydraulic plate 100, and the mounting plane is fit with the bottom surface of the hydraulic plate 100 and is fixedly connected with the bottom surface of the hydraulic plate 100. Thus, a pressure applied to the hydraulic plate 100 can be better correspondingly transferred to the mounting plane of the sheath 200 to avoid stress concentration caused by the partial contact of the hydraulic plate 100 with the mounting plane, which further facilitates the stable circulation of the hydraulic medium in the hydraulic plate.

Preferably, in the embodiment, the outline of the hydraulic plate 100 is similar to or the same as the outline of the mounting plane. Thus, the mounting is simpler and more convenient through matching the hydraulic plate 100 and the mounting plane.

Concretely, in the embodiment, the sheath 200 comprises a sleeve part having a hollow interior, and one end of the regulating foot 300 is sleeved in the sleeve part and is axially movable relatively. An upper end of the sleeve part is flanged to form the mounting plane, and the mounting plane is fit with the bottom surface of the hydraulic plate 100 and is fixedly connected with the bottom surface of the hydraulic plate 100. According to the embodiment, the mounting plane is formed by the outward flanging of the upper end of the sleeve part, the regulating foot 300 axially moves in the sheath 200, and only the area of the mounting plane is enlarged, the whole of the sheath 200 is not enlarged. Thus, materials are saved, and the cost is reduced.

Concretely, in the embodiment, the hydraulic plate 100 is of a square flat-plate structure, the sleeve part is of a cylindrical structure. An upper end of the cylindrical structure flanges outward to form the square mounting plane which is matched with the hydraulic plate. And the square flat-plate structure is fit with the square mounting plane and is fixedly connected with the square mounting plane.

Concretely, in the embodiment, at least one second mounting structure 104 is arranged at each of four corners of the hydraulic plate; and one first mounting structure 103 is provided on at least one side of each second mounting structure 104;

Preferably, one second mounting hole is formed at each of the four corners of the hydraulic plate 100, and the two sides of each second mounting hole are provided with a first mounting hole.

In the embodiment, according to the structure and mounting characteristics of the household appliance support, the first mounting holes are more than the second mounting holes, so that the household appliance support can be stably mounted on the household appliance. The first mounting holes are distributed at the two sides of the second mounting holes, thus, the total weight of the household appliance can be more uniformly distributed on the hydraulic plate 100 to avoid the damage of the hydraulic plate caused by local stress concentration.

As a mounting mode of the embodiment, the sheath 200 and the hydraulic plate 100 can be fixedly connected by clamping, adhesive bonding, hot melt, or welding, and then fixedly mounted on the bottom of the household appliance.

According to the embodiment, the hydraulic plate 100 is made of plastics through integral injection molding or made of metal through die-casting. And the sheath 200 is made of plastics through integral injection molding or made of a metallic material through die-casting.

According to stress characteristics of the household appliance support provided by the embodiment, preferably, the hydraulic plate 100 is made of plastics through integral injection molding. And the sheath 200 is made of metal through die-casting. Due to larger stress on the sheath 200, the sheath 200 is made of metal through die-casting to guarantee strength, thus, the household appliance support provided by the embodiment is lower in manufacturing cost, and the overall strength of the household appliance support can be guaranteed.

Partial gravity F1 of the household appliance is applied to the hydraulic plate 100 through the bottom plate. The plane of the hydraulic plate 100 can transmit the force to the mounting plane of the sheath 200. Stress of the interior of the hydraulic plate 100 is transferred to the regulating foot 300 through hydraulic pressure, the regulating foot 300 similarly bears a supporting force F2 from a supporting surface, and the F1 is equal to the F2. And stress of the regulating foot 300 is transferred to the plane of the hydraulic plate 100, and the stress is then transferred to the bottom plate of the household appliance by the hydraulic plate 100. By such a design, although the hydraulic plate 100 bears a pressure force of internal liquid flow passages, a partial gravity force of the washing machine and the supporting force of the regulating toot 300, the forces are all transferred to the mounting plane of the sheath 200, the regulating foot 300 and the bottom plate of the household appliance.

As a preferred implementation mode of the embodiment, the household appliance support provided by the embodiment further comprises a flexible accommodation body 500 with a chamber therein, and the hydraulic medium is accommodated in the flexible accommodation body 500; and a third mounting structure 105 which is used for mounting the flexible accommodation body 500 in a sealed manner is arranged on the hydraulic plate 100.

Concretely, the liquid flow passages are formed inside the hydraulic plate 100, the flexible accommodation body 500 has an opening part 502, and the opening part of the flexible accommodation body 500 is fixedly mounted on the bottom surface of the hydraulic plate 100 through a pressing ring 600 and communicates with the liquid flow passages. And the third mounting structures 105 are third mounting holes, and the pressing ring 600 is assembled on the third mounting holes through third connecting members.

Further, in the embodiment, the third mounting hole is disposed in the middle part of the hydraulic plate, and the third mounting hole includes at least four, corresponding to the four corners of the hydraulic plate 100.

As a preferred implementation mode of the embodiment, in the embodiment, the opening part 502 of the flexible accommodation body 500 is fixedly mounted on the bottom surface of the hydraulic plate 100 through the pressing ring 600, and the pressing ring 600 and the hydraulic plate 100 jointly press the opening part 502 to deform and seal. According to the embodiment, the pressing ring 600 is used for pressing the opening part 502 to deform for sealing, so that the sealing is simpler and more convenient, and the sealing effect is good.

Further, the flexible accommodation body 500 comprises a thin-diameter part, and one end part of the thin-diameter part is flanged to form the opening part 502. The pressing ring 600 sleeves on the thin-diameter part, the pressing ring 600 and the hydraulic plate 100 jointly press the opening part 502 to deform and seal. According to the embodiment, during the sealed mounting of the flexible accommodation body 500, the thin-diameter part can be firstly nested in the pressing ring 600, and only the pressing ring 600 is need to be fixedly mounted. In the process of fastening, the pressing ring 600 presses the opening part 502 to achieve the scaled mounting.

As an implementation mode of the embodiment, a hydraulic plate groove 107 is arranged at the bottom surface of the hydraulic plate 100, and the opening part 502 of the flexible accommodation body 500 is deformed and filled into the hydraulic plate groove 107 for sealing under pressure of the pressing ring 600. In this mode, scaling can be achieved through fastening the pressing ring 600 and pressing the opening part 502 of the flexible accommodation body 500 to deform and fill into the hydraulic plate groove 107. The structure is simple, and the sealing is reliable and effective.

Preferably, a volume enclosed by the hydraulic plate groove 107 and the pressing ring 600 is smaller than a volume of the opening part of the flexible accommodation body 500. Thus, the opening part of the flexible accommodation body 500 can be in tight contact with the hydraulic plate groove 107 to ensure sealing performance.

According to the embodiment, the pressing ring 600 is fixed to the hydraulic plate 100 through fixing devices. And specifically the pressing ring 600 and the hydraulic plate 100 can be fixedly connected through bolts/screws. The pressing ring 600 is provided with a pressing ring mounting hole. And the bolts/screws pass through the pressing ring mounting holes and are fastened to the third mounting holes of the hydraulic plate 100.

According to the embodiment, tire flexible accommodation body 500 comprises an accommodating body 501. The accommodating body 501 is of a soft capsular structure which has a telescopic corrugation structure. And the corrugation structure is arranged in the regulating foot 300 and extends and retracts depending on the flowing of the hydraulic medium to drive the regulating foot 300 to axially move in the sheath 200 for leveling.

The household appliance support, provided by the embodiment, further comprises a protective member 700 for protecting the flexible accommodation body 500. The pressing ring 600 is embedded in the protective member 700, and then, technical effects as follows are achieved:

1. According to the embodiment, the pressing ring 600 and the protective ring 700 are mounted in an embedded manner so as to limit the position of pressing ring 106 and prevent the installation of a complicated limiting structure. And this limiting is simple and stable.

2. According to the household appliance support provided by the embodiment, under extremely high impact pressure (for example, a household appliance or an object equipped with the household appliance support falls off or is lifted and suddenly placed), as there is no gap between the protective ring 700 and the pressure exerted fitting surfaces of the flexible accommodation body 500, so that the flexible accommodation body 500 is prevented from problems such as expansion cracking resulting from gaps, and the reliability is improved.

3. According to the embodiment, the pressing ring 600 and the protective ring 700 are mounted in an embedded manner, and the mounting height of the pressing ring 600 and the protective ring 700 is lowered, so that the overall height of the household appliance support is lowered. And the influence on the overall center of gravity of the household appliance caused by mounting the household appliance support on the household appliance is less, the stability of supporting of the household appliance is better facilitated, and the shock absorption effect on vibration of the household appliance during working (for example, dewatering vibration of the washing machine) is better.

As a preferred implementation mode of the embodiment, a protective curved surface is arranged at one end of the protective ring 700 and is matched with an outside, surface of the flexible accommodation body 500 to prevent the flexible accommodation body 500 from being broken under pressure.

According to the embodiment, an embedding groove is formed in the other end of the protective ring 700, and the pressing ring 600 is embedded in the embedding groove of the protective ring 700.

As a preferred implementation mode of the embodiment, a limiting convex portion is formed on the internal wall of the embedding groove of the protective ring 700, and a limiting concave portion matched with the limiting convex portion is formed on a fixing member. According to the embodiment, a limiting structure is designed according to the embedded mounting of the pressing ring 600 and the protective ring 700, and limiting motion is achieved while carrying out embedded mounting. And thus, the structure is simple, stable and reliable.

According to the embodiment, the depth of the embedding groove is greater than the thickness of the pressing ring 600, thus, the pressing ring 600 can be completely embedded into the embedding groove, and the mounting height is lowered to the maximum to lower the overall height of the household appliance support. Meanwhile, when the household appliance support is in an out-of-flat state, each flexible accommodation body 500 bears different pressure forces, the hydraulic medium flows, and the flexible accommodation body 500 extends and retracts to drive the regulating foot 300 to axially move in the sheath 200 for leveling. The extending and retracting of the flexible accommodation body 500 inevitably acts on the protective ring 700, and the protective ring 700 axially moves under the embedded limiting of the embedding groove and the pressing ring 600.

In the embodiment, the circumference of the protective ring 700 completely wraps the pressing ring 600, and the protective ring 700 is pressed into the regulating foot 300, and thus, the reliability and the stability of fitting are greatly improved. Therefore, after the protective ring 700 is pressed into the regulating fool 300, the protective ring 700 will always axially move in the regulating foot 300 stably, and the moving is smooth and reliable. The entire household appliance support can be more stable because of the protective ring 700 and the regulating foot 300, and both the protective ring 700 and the pressing ring 600 can have a certain amount of activity up and down.

According to the household appliance support provided by the embodiment, the sheath 200 and/or the regulating foot 300 are provided with a guiding limiting mechanism which is used for limiting the circumferential rotation of the regulating foot 300 relative to the sheath 200. And a port 106 corresponding to the guiding limiting mechanisms is arranged in the hydraulic plate 100.

According to the household appliance support provided by the embodiment, the household appliance is automatically leveled by using the hydraulic principle, and the leveling is simple and reliable. And the regulating foot 300 is arranged in the sheath 200 in a manner of being capable of axially moving relative to the sheath 200, and the regulation on the household appliance is only limited to a vertical direction, so that in order to guarantee the stability of leveling, the rotation of the regulating foot 300 relative to the sheath 200 is need to be limited. Therefore, the guiding limiting mechanisms are used for limiting the regulating foot 300 to move along a required direction relative to the sheath 200.

As the household appliance (for example, a washing machine) generally will generate vibration during working, in order to guarantee the stability of running of the household appliance, the overall height of the household appliance support provided by the embodiment should be lowered as far as possible to lower the center of gravity of the household appliance. Therefore, the ports 106 are formed in the hydraulic plate 100 corresponding to the guiding limiting mechanisms. While meeting the setting of the guide limiting mechanism, it does not affect the axial movement of the regulating foot 300, so as to reduce the overall height of the household appliance support and improve the damping stability. Concretely, the guiding limiting mechanisms comprise a guiding limiting groove/a guiding limiting convex portion arranged on the internal wall of the sheath and a guiding limiting convex portion/a guiding limiting groove correspondingly arranged on the external wall of the regulating foot. And the guiding limiting convex portions are arranged in the guiding limiting grooves in a relatively slidable manner to limit the circumferential rotation of the regulating foot relative to the sheath. According to the embodiment, the axial moving of the regulating foot 300 can be limited through the cooperation of the guiding limiting grooves and the guiding limiting convex portions, and thus, the structure is simple and reliable.

According to the embodiment, the ports 106 are arranged corresponding to the guiding limiting convex portions/guiding limiting grooves of the regulating foot 300, and the regulating foot 300 moves towards the hydraulic plate 100. One end of each guiding limiting convex portion/guiding limiting groove of the regulating foot 300 enters into one corresponding port 106. According to the embodiment, in view of the axial moving of the regulating foot 300, only the yielding parts are need to be arranged corresponding to the guiding limiting convex portions/guiding limiting grooves of the regulating foot 300 regardless of the type of the guiding limiting mechanisms. So that, on the premise of not changing regulating height, the overall height of the household appliance support is lowered, and the stability of guiding and limiting is guaranteed.

As a preferred implementation mode of the embodiment, guiding limiting grooves are formed in the internal wall of the sheath 200 along an axial direction of the sheath 200. The guiding limiting convex portions are arranged on the external wall of the regulating foot 300, and the guiding limiting convex portion is relatively slidably disposed in the guiding limiting groove to limit the circumferential rotation of the regulating foot 300 relative to the sheath 200.

According to the embodiment, the ports 106 are formed in the hydraulic plate 100 corresponding to the guiding limiting convex portions. The regulating foot 300 axially moves up and down in the sheath 200, and one end of each guiding limiting convex portion goes into/out of one corresponding port 106.

Therefore, according to the household appliance support provided by the embodiment, one end of each guiding limiting convex portion goes into/out of to one corresponding port 106, so that a greater regulating height is achieved under the condition of the same overall height. And under the condition of the same regulating height, the household appliance support provided by the embodiment has a smaller overall height.

As a preferred implementation mode of the embodiment, each guiding limiting convex portion comprises a first guiding limiting block 302 and a second guiding limiting block 301. The first guiding limiting blocks 302 are fixed to the external wall of the regulating foot 300, and the second guiding limiting blocks 301 are fixed to the first guiding limiting blocks 302 and extend by a certain height towards the hydraulic plate 100. According to the embodiment, the first guiding limiting blocks 302 mainly play roles in carrying out guiding and limiting in the guiding limiting grooves, and the second guiding limiting blocks 301 prolong the first guiding limiting blocks 302. And thus, the stability of guiding and limiting is better.

As a preferred implementation mode of the embodiment, a plurality of guiding limiting mechanisms are distributed along circumferential directions of the sheath 200 and/or the regulating foot 300. And a plurality of ports 106 are formed in the hydraulic plate 100 corresponding to the guiding limiting mechanisms. By setting a plurality of guiding limiting mechanisms, the stability of limiting is further improved, and the effect of guiding and limiting is better.

According to the embodiment, in order to achieve the up-and-down movement of the regulating foot 300 in the sheath 200 and prevent circumferential rotation, a certain quantity of guiding limiting grooves are formed in the circumference of the sheath 200, and the quantity is N which is greater than or equal to 1. In a graphic illustration of the present disclosure, N is 4 preferably.

Correspondingly, guiding limiting convex portions are arranged on the circumference of the regulating foot 300, and the quantity of the guiding limiting convex portions is N which is greater than or equal to 1. In a graphic illustration of the present disclosure, N is 4 preferably. The guiding limiting convex portions can move in the guiding limiting grooves and are limited by stopping end parts in bottom of the guiding limiting grooves to prevent the regulating foot 300 from failing off from the sheath 200.

In order to lower the height of the household appliance support as far as possible and achieve better stability, the height of a sheath 200 and the height of a regulating foot 300 can be reduced as far as possible in principle, particularly the height of a superposed part, under the condition of not lowering a regulating height H0.

Hydraulic nozzles 101 are arranged on the hydraulic plate 100 of the household appliance support in the present embodiment, and the hydraulic nozzles 101 are communicated with the internal liquid flow channels. Two household appliance supports for the household appliance are respectively connected to the hydraulic nozzle 101 via a hydraulic pipe, to realize the communication between two household appliance supports for the household appliance. Hydraulic medium can circulate among household appliance supports for the household appliance which are communicated with each other.

Further, the hydraulic plate in the present embodiment is provided with a convex block 102 with an increased thickness, and the hydraulic nozzle 101 is arranged on the convex block 102 to increase the diameter of the hydraulic nozzle 101 and further increase its overall strength.

Embodiment 3

The present embodiment simultaneously provides a household appliance with the household appliance support provided by any one of the above-mentioned embodiments. The household appliance includes a casing, and multiple household appliance supports for the household appliance are mounted at the bottom of the casing. A hydraulic medium filled in the household appliance support can flow among the footings for the household appliance for leveling.

Preferably, at least two household appliance supports for the household appliance are communicated with each other through communicating devices to achieve the flowing of the hydraulic medium among the household appliance supports for the household appliance.

In an embodiment of the present disclosure, with a washing machine as an example, the principle and method of automatic leveling of a washing machine realized through the household appliance support in the present disclosure are described. After the washing machine is mounted, since the ground is not flat, horizontal heights of different household appliance supports for the household appliance are different, and household appliance supports for the household appliance located at a concave pit on the ground are low in position. Therefore, it can be seen that, the household appliance supports for the household appliance located at a high position firstly bear the weight of the washing machine, and bear a great force of gravity, and the household appliance supports for the household appliance located at a low position hear a small force of gravity due to footing failure.

Regulating foots of the household appliance supports for the household appliance at high positions will move up under a high pressure, and heights of the entire household appliance supports are reduced, such that volumes of hollow chambers of flexible accommodation bodies full of hydraulic medium are compressed and reduced. The hydraulic medium is forced to enter throttling holes or valve holes and enter into the household appliance supports for a household appliance at low positions through high-pressure pipes. Therefore, the hydraulic medium in flexible accommodation bodies of the household appliance supports for the household appliance at low positions becomes more and more, and the flexible accommodation bodies are expanded to promote the stretching of the regulating foots.

When the household appliance supports at high positions and the household appliance supports at low positions are the same in hydraulic pressure, the hydraulic medium does not flow through the high-pressure pipes any more. Relative positions of the regulating foot and a bottom plate of the washing machine do not change any more, and the automatic regulating of the washing machine is completed.

During the washing or drying process of the washing machine, the hydraulic medium can also slowly flow for self-leveling, so that vibration noises of the washing machine are greatly lowered.

The hydraulic medium in the present embodiment may adopt hydraulic oil which is good in fluidity and stable in ingredients.

In addition, the household appliance support provided by each of the above-mentioned embodiments of the present disclosure can also be applied to household appliances such as electric refrigerators, coolers and air-conditioner indoor units, besides washing machines.

It should be noted that, each of the above-mentioned embodiments of the present disclosure can be implemented independently and can also be implemented by combining a plurality of embodiments.

The above description is only preferred embodiments of the present disclosure, and is not intended to limit the present disclosure in any form. Although the present disclosure has been disclosed in the preferred embodiments, it is not intended to limit the present disclosure. Any person familiar with this patent can make some changes or modifications to equivalent embodiments with equivalent changes by using the above-mentioned technical contents without departing from the scope of the technical solution of the present disclosure. However, any simple amendments, equivalent changes and modifications made to the above embodiments according to the technical essence of the present disclosure without departing from the contents of the technical solution of the present disclosure are still within the scope of the solution of the present disclosure.

The invention claimed is:

1. A household appliance support, comprising:
   a hydraulic plate;
   a sheath, being fixedly connected with the hydraulic plate;
   a regulating foot, being arranged in the sheath, and one end of the regulating foot is arranged in the sheath and axially movable relative to the sheath, another end of the regulating foot is a supporting end part in supportable contact with a supporting surface, the regulating foot configured to move axially in the sheath for leveling;
   an accommodation chamber, being formed by the hydraulic plate, the sheath and the regulating foot, the accommodation chamber configured to accommodate a hydraulic medium in a sealed manner; and
   a damping element, being embedded and mounted on the supporting end part of the regulating foot, to increase a supporting damping force between the regulating foot and the supporting surface;
   wherein a mounting groove is arranged on the supporting end part;
   the mounting groove comprises a first mounting groove and a second mounting groove;
   both the first mounting groove and the second mounting groove are concave from the supporting end part, a depth of the second mounting groove is greater than a depth of the first mounting groove; and
   the damping element is provided with a first convex part and a second convex part;
   both the first convex part and the second convex part protrude out of an upper surface of the damping element, a height of the second convex part is greater than a height of the first convex part; and
   the first convex part is correspondingly embedded into the first mounting groove, and the second convex part is correspondingly embedded into the second mounting groove.

2. The household appliance support according to claim 1, wherein the first mounting groove is an annular groove which takes a central axis of the supporting end part as a central axis,
   the first convex part is an annular convex step which protrudes out of the upper surface of the damping element and takes a central axis of the damping element as a central axis, and
   the annular convex step is matched with the annular groove; and
   the second mounting groove is a circular groove which is arranged in a center area of the supporting end part,
   the second convex part is a convex column structure which protrudes out of the upper surface of the damping element and is arranged in a center area of the damping element, and
   the convex column structure is embedded into the circular groove.

3. The household appliance support according to claim 1, wherein the first mounting groove is formed by setting a middle part of a bottom wall of the supporting end part to be higher than an edge of the bottom wall, and
   the second mounting groove is formed by enabling a central position of the bottom wall of the supporting end part to be concave towards an inside of the regulating foot.

4. The household appliance support according to claim 3, further comprising a flexible accommodation body with a chamber therein,
   wherein the chamber of the flexible accommodation body is configured to accommodate the hydraulic medium, the flexible accommodation body is provided with an opening part, and is mounted on the hydraulic plate in a sealed manner, and a liquid flow passage is formed inside the hydraulic plate and communicated with the chamber of the flexible accommodation body so the hydraulic medium can flow between the flexible accommodation body and the liquid flow channel, to drive the regulating foot to move axially in the sheath for leveling; and an evading part is arranged, corresponding to the second mounting groove of the regulating foot, on the flexible accommodation body.

5. The household appliance support according to claim 4, wherein the flexible accommodation body comprises an accommodating body which is stretchable, the opening part is a thin-diameter structure which is communicated with the accommodation body, the accommodation body is arranged inside the regulating foot, and one end, in contact with an inner wall of the supporting end part, of the accommodation body is partially concave corresponding to the second mounting groove to form the evading part.

6. The household appliance support according to claim 4, wherein a surface of one end of the hydraulic plate is provided with a mounting convex column, the opening part of the flexible accommodation body covers the mounting convex column and is mounted on the hydraulic plate in a sealed manner, and an end part of the mounting convex column is provided with a groove.

7. The hydraulic appliance support according to claim 4, comprising a hydraulic medium, wherein the hydraulic medium is compressible and expandable to drive the regulating foot to move axially in the sheath for levelling.

8. A household appliance with the household appliance support according to claim 1.

9. The household appliance according to claim 8, comprising a hydraulic medium, wherein the hydraulic medium is compressible and expandable to drive the regulating foot to move axially in the sheath for levelling.

10. The household appliance support according to claim 1, comprising a hydraulic medium, wherein the hydraulic medium is compressible and expandable to drive the regulating foot to move axially in the sheath for levelling.

* * * * *